July 26, 1949.    F. J. RINEHART    2,477,207
SHIELDED ELECTRODE HOLDER
Filed Aug. 2, 1948
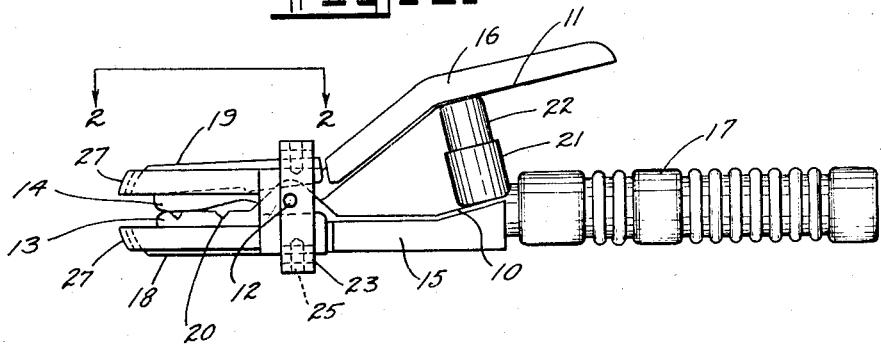
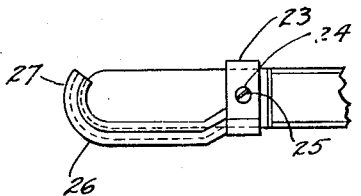
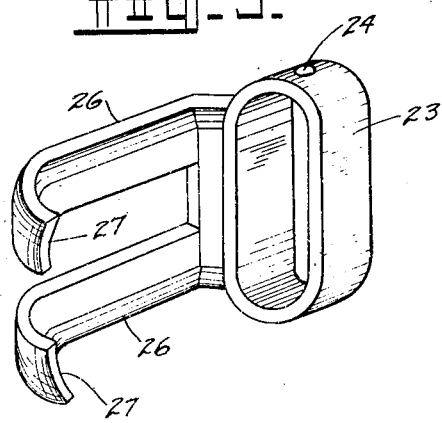
INVENTOR.
Fred J. Rinehart.
BY
ATTORNEY.

Patented July 26, 1949

2,477,207

UNITED STATES PATENT OFFICE 2,477,207

SHIELDED ELECTRODE HOLDER

Fred J. Rinehart, Youngstown, Ohio

Application August 2, 1948, Serial No. 42,090

5 Claims. (Cl. 219—8)

This invention relates to an electrode holder and more particularly to a shielded electrode holder.

The principal object of the invention is the provision of an electrode or welding rod holder provided with means shielding the jaws and insulators thereof.

A further object of the invention is the provision of a simply formed shield for an electrode holder.

A still further object of the invention is the provision of an improved and simplified shielded electrode holder which may be economically manufactured and will be efficient in use.

A still further object of the invention is the provision of a shield for an electrode holder for providing protection against electric shock and burns and increasing the life of the electrode holder by shielding the same from the heat and other effects of a welding operation.

It is well known in the art of electric welding that many and various forms of electrode or welding rod holders have been devised and that such electrode holders have generally comprised metal structures covered or partially covered with insulating material so that a workman utilizing the same may be protected from electric shock and burn. Electrode holders include manually operable jaw portions which are usually partially insulated and arranged to receive and hold the welding rod between the un-insulated portions thereof.

The present invention relates to an improved form of heat shielding applied to the jaw portions of the electrode holders to protect the same from the heat and other effects of a welding operation performed in proximity thereto as, for example, with a shortened welding rod to the end that the life of the electrode holder, and, in its entirety, may be greatly increased. It is also well known in the art that electrode holders have been provided with replaceable insulating means on and about the jaw portions as the heat commonly associated with a welding operation destroys the insulating material relatively rapidly and makes replacement of such insulating parts necessary.

The present invention, therefore, provides for the effective shielding of the said insulating portions applied to the jaw members of a welding electrode whereby their life may be greatly increased.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of the electrode holder showing the shielding means in place thereon.

Figure 2 is a top plan view of a portion of the device shown in Figure 1 and taken on line 2—2 of Figure 1.

Figure 3 is an enlarged perspective view of the shield employed with the electrode holder illustrated in Figure 1.

By referring to the drawings and Figures 1 and 2 in particular it will be seen that an electrode holder has been disclosed which comprises a lower handle 10 and an upper handle 11 pivoted together by means of a pivot 12 and having their adjacently positioned ends formed into material engaging jaws 13 and 14, respectively. Each of the handles 10 and 11 are provided with insulating sheaths 15 and 16, respectively, and the handle 10 has an insulated extension 17 thereon through which an electrical conductor (not shown) in usually positioned. Each of the respective jaw portions 13 and 14 are provided with insulating sheaths 18 and 19 which overlie the outermost surfaces of the said jaws. The opposed surfaces of the jaws 13 and 14 are provided with suitable patterns 20 formed therein so that electrodes may be readily held thereby. A pair of cup-shaped holders 21 and 22 are affixed to the handles 10 and 11, respectively, and telescopically engage one another and cage a coil spring (not shown). The action of the coil spring positioned within the cup-shaped telescopically engaged holders 21 and 22 normally urges the jaws 13 and 14 of the electrode holder toward one another.

Positioned about the pivotal area of the handles 10 and 11 there is a ring-like band 23 which is drilled and tapped at several locations 24—24. Screws 25—25 are engaged in some of the openings 24—24 for engagement with the insulating sheaths 18 and 19, respectively, so as to retain the ring-like band 23 thereon. The ring-like band has a bifurcated shield 26 positioned thereon at right angles thereto and offset slightly with respect thereto. The bifurcated shield 26 is curved at its outermost end, as indicated by the numeral 27—27 and, additionally, is curved transversely as may best be seen by referring to Figure 3 of the drawings.

By referring again to Figures 1 and 2 of the drawings it will be seen that the bifurcated shield 26 extends outwardly over the left side of the electrode holder, as shown in Figures 1 and 2, and is thereby in position to shield the jaws 13 and 14 thereof as well as the insulating sheaths 18 and 19 thereon. The shield is effective on the side of the electrode holder and on the foremost end thereof and covers all areas exposed to the heat and other effects of a welding operation.

It will be obvious to those skilled in the art that the foregoing description of the bifurcated shield 26 with respect to the left side of the electrode holder are those applicable when the tool is used in the right hand of the workman. At such time as the tool is used in the left hand of the workman the shield is removed by releasing the screws 25 and reversed with respect to the jaws 13 and 14 so that the shield covers the right side of the electrode holder.

It will be seen that the shielded electrode holder disclosed herein meets the several objects of the invention and it will also be obvious that the heretofore necessary replacement of the insulating sheaths on the jaws of the electrode holders is completely avoided thereby rendering a substantial savings. Additionally, the heretofore frequently necessary task of rebuilding and reshaping the metal portions of the handles 10 and 11 forming the electrode engaging portions 20 of the jaws 13 and 14 is eliminated as the jaws 13 and 14 as well as their insulating sheaths 18 and 19 are completely protected by the bifurcated shield 26 with its transversely curved shape and its overwrapping end formation. The bifurcated shield disclosed herein in connection with the electrode holder is preferably formed of copper so that such heat as is picked up thereby may be readily dissipated.

Having thus described my invention, what I claim is:

1. In an electrode holder having a pair of handles pivoted to one another, portions of which form electrode engaging jaws; a bifurcated shield affixed to said jaws adjacent their pivotal connection, the said shield extending longitudinally of the said jaws at one side thereof and having the ends thereof curved about the ends of the said jaws.

2. A shield for an electrode holder having interpivoted clamp jaws, said shield comprising a band of suitable material having a bifurcated elongated offset extension formed thereon at right angles thereto, each of the outermost ends of the said bifurcated elongated offset extension being formed in a radius, fasteners on said band for engagement with said electrode holder jaws.

3. A shield for an electrode holder having interpivoted clamp jaws, said shield comprising a band of suitable material having a bifurcated elongated extension formed thereon, each of the outermost ends of the said bifurcated elongated extension being formed in a radius, and means on the said band for engagement with the interpivoted jaws of the electrode holder at their point of pivotal connection.

4. In an electrode holder having a pair of handles pivoted to one another, portions of which form electrode engaging jaws; a bifurcated shield affixed to the said jaws adjacent their pivotal connection, the said shield extending longitudinally of the said jaws at one side thereof and having the ends thereof curved about the ends of the said jaws, each section of the bifurcated elongated extension being curved transversely.

5. In an electrode holder having a pair of handles pivoted to one another, portions of which form electrode engaging jaws; a bifurcated shield affixed to the said jaws, the said shield extending longitudinally of the said jaws at one side thereof and having the ends thereof curved about the ends of the said jaws, the bifurcated extension being curved transversely on its outermost longitudinal edges.

FRED J. RINEHART.

REFERENCES CITED

The following references are of record in the file of this patent:

UNITED STATES PATENTS

| Number | Name | Date |
|---|---|---|
| 1,677,306 | Stancliff | July 17, 1928 |
| 2,411,980 | Ringwald | Dec. 3, 1946 |